United States Patent Office 3,278,487
Patented Oct. 11, 1966

3,278,487
MACRORETICULAR MERCAPTYL REDOX POLYMERS
Kenneth A. Kun, Riverton, N.J., assignor to Rohm & Haas Company, Philadelphia, Pa., a corporation of Delaware
No Drawing. Filed Aug. 17, 1962, Ser. No. 217,533
2 Claims. (Cl. 260—47)

This invention concerns polymers which are known as redox polymers inasmuch as they can be reversibly oxidized and reduced. More specifically, it concerns cross-linked macro-reticular-structured mercaptyl redox polymers.

Many of the redox polymers of the prior art exhibit poor physical and chemical stability and an object of the present invention is to provide mercaptyl redox polymers which are characterized by excellent physical and chemical stability.

Many of the prior art cross-linked redox polymers exhibit low capacity and low rates of reaction. An object of this invention is to provide mercaptyl redox polymers which have high capacity and high rates of reaction.

Mercaptyl redox polymers as such are known in the prior art. Cassidy in the J. Am. Soc. 71, 402 (1949) describes the use of a sulfhydryl-disulfide redox system on a polymeric backbone as electron exchange or redox polymers. Brubaker in U.S. Patents 2,378,535 and 2,378,536 describes the preparation of monomeric and polymeric vinyl thioacetate and the hydrolyzed polymeric vinyl thiol.

Gregor in the J. Am. Chem. Soc. 77, 3675 (1955) describes the preparation of poly(thiol styrene) by nitration of polystyrene, reduction of the product to poly(amino styrene), and diazotization of poly(amino styrene) to form the diazonium chloride. This is followed by treatment with potassium ethyl xanthate, the xanthate is hydrolyzed with base and then acidified to give poly(thiol styrene).

Overberger in the J. Am. Chem. Soc. 77, 3675 (1955); 78, 4792 (1956) describes the preparation of p-vinyl phenyl thioacetate, its homopolymer and the copolymer with methyl methacrylate.

Parrish in Chem. & Eng., 18, 137 (1956) describes the preparation of a conventional or gel-type cross-linked styrene-divinylbenzene copolymer, containing 2% divinylbenzene, that is chloromethylated, treated with thiourea and then hydrolyzed with alkali to give poly(vinyl benzyl mercaptan).

Trostyanshaya in Zuhr. Anal. Khim., 15, 461 (1960) describes the preparation of mercaptyl polymers by chloromethylating conventional copolymers of styrene and divinylbenzene. Conversion of the chloride to mercaptyl is accomplished by reaction of sodium hydrosulfide or thiourea with subsequent saponification using alkali.

Synthetic methods for the preparation of mercaptyl derivatives described hereinbefore and others such as addition of hydrogen sulfide to unsaturates or treatment of organic esters of inorganic acids with metal hydrosulfides or reaction of organic halides with metal hydrosulfides or disulfides are known in the art and do not constitute the present invention.

Applicant's materials as set forth in detail hereinafter comprise cross-linked macroreticular-structured mercaptyl redox polymers whose structures are markedly different from the so-called conventional or gel-type copolymers described hereinbefore.

The proposed invention encompasses a cross-linked macroreticular-structured mercaptyl redox polymer that is physically and mechanically stable, has high reactivity and whose redox system is reversible. These electron exchange polymers are prepared from macroreticular-structured chloromethylated poly(styrene-divinylbenzene) copolymers by reaction with thiourea to give an isothiouronium intermediate which yields the poly(vinyl benzyl mercaptan-divinylbenzene) copolymer upon alkaline hydrolysis. The reactions proceed with good yields in all cases.

Conventional gel-type mercaptyl redox polymers and cross-linked macroreticular mercaptyl redox polymers were prepared in which the bead matrices varied in cross-linker content, surface area and porosity. During the preparation of these mercaptyl redox polymers, the poor physical stability described for conventional mercaptyl redox polymers by Trostyanskaya was observed. The conventional gel-type mercaptyl redox polymers break down to a granular powder. Their physical and mechanical stability are very poor. But, surprisingly, while conventional mercaptyl redox resins degrade to powders, the cross-linked macroreticular mercaptyl redox polymers retain the spherical form found in bead polymers. This difference in physical stability is also observed after an oxidation-reduction cycle. The conventional mercaptyl copolymer continues to degrade physically while the macroreticular mercaptyl copolymers retain their original form and show no sign of physical degradation.

Another unexpected observation that distinguishes the conventional and macroreticular mercaptyl redox polymer is the degree of regeneration of the reduced form from the oxidized form. Parrish, in describing the conventional gel form of poly(vinyl benzyl mercaptan-divinylbenzene), states that regeneration with sodium hydrosulfite solution is incomplete: the white resin was stained brown with iodine, and this color could not be removed during the regeneration step. Even when using the conventional gel mercaptyl resin as a fine powder, the disadvantages described in the prior art were present. But, following the same oxidation-reduction procedure with the macroreticular mercaptyl polymers, the macroreticular resins are completely reduced with aqueous sodium hydrosulfite and the brown iodine color is completely removed by this regeneration procedure.

That the structure of the conventional resins is markedly different from the macroreticular-structured redox polymer is evident from the rate of reaction with, for instance, an iodine solution. Comparative reaction rates of the conventional and the macroreticular mercaptyl redox polymers showed the macroreticular mercaptyl redox polymers to have surprisingly high reactivity rates. Four resins, one prepared using a styrene-3% divinylbenzene backbone copolymer in the conventional fashion, and the others prepared with various macroreticular structures were converted to redox polymers as described hereinbefore. See Table I for the characteristics of these materials. Based on a sulfur analysis, the conventional gel-type mercaptyl redox copolymer, Resin A, has a higher capacity than the three cross-linked macroreticular resins B, C and D. But, even after forty-eight hours of contact with an aqueous iodine solution, the conventional gel type redox resin only reached a capacity of 2.40 meq./gram. The macroreticular redox resins reached this value within 15 to 30 minutes after being added to the iodine solution. See Table II. After forty-eight hours of continuous contact with the iodine solution, the conventional redox polymer still shows an increasing capacity while the reaction rates for the macroreticular redox polymers have reached full capacity and have leveled off after eight hours.

When in the reduced form, the resins of the present invention are valuable for removing oxygen from water, such water generally being used for boiler feed. The oxygen can be destroyed by sulfites, etc., but by using the resins of the present invention, no foreign substances are added to the water. This is particularly important when boilers are operated at very high pressures.

When the resins of the present invention are in the reduced form, they can be used as chemical reactants with protein and protein-like materials. These reaction products can be used as part of synthetic enzyme systems. When in the reduced form, they are useful as fungicides and bacteriocides.

The halomethylated copolymer in prepared as set forth in U.S. Patent 2,629,710 and the information therein is incorporated herein by reference. The preferred embodiment is a copolymer of styrene and divinylbenzene, in which the divinylbenzene content can be from 1 to 55% of the total monomer mixture. While such copolymers are particularly advantageous from the standpoint of economy and availability, other monoethylenically unsaturated monomers may be substituted for all or part of the styrene. Thus, vinyl toluene, α-methylstyrene, and vinyl naphthalene can be substituted for the styrene. Part of the styrene may be replaced with alkyl esters of acrylic or methacrylic acid.

Cross-linkers other than divinylbenzene, such as divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono- or dithio-derivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N'-methylenediacrylamide, N,N'-methylenediamethacrylamide, N,N'-ethylenediacrylamide, 1,2-bis(α-methylmethylene sulfonamido)-ethylene, trivinylbenzene, trivinylnaphthalene, and polyvinylanthracenes, can also be employed. These cross-linkers generally constitute from 1% to 55% of the monomer mixture.

The essential matrices for the highly reactive, physically stable, high capacity polymeric structure of the mercaptyl redox polymers are those which possess what is now known as a macroreticular structure. While it is frequently stated that all gel ion exchange resins have micropores, the important porosity in the macroreticular-structured resin is not contributed by such micropores. It is macroporous in the true sense and is characterized by high specific surface. With the conventional or so-called gel-type resins, the specific surface as measured by the Brunnauer, Emmett & Teller method is always less than 1 sq. m./g., and is limited to the surface derived from the geometry of the particles. With the resins which possess macroreticular structure, the specific surface, also measured by the Brunnauer, Emmett & Teller method, is always in excess of 1 sq. m./g. and can be as high as 300 sq. m./g. The specific surface value depends on several variables and is proportional to the amount of cross-linker and the amount of "precipitant" (described hereinafter) which is employed; the highest values for specific surface are obtained at high cross-linker and high "precipitant" contents.

These resins are prepared by polymerizing a mixture of a monoethylenically unsaturated monomer and a polyethylenically unsaturated monomer in the presence of a substance, designated the "precipitant," which is a solvent for the monomer mixture, but does not swell nor is imbibed by the cross-linked polymer so formed. As the copolymerization reaction proceeds and the amount of monomer in the mixture decreases, it is postulated that the added liquid, not being able to dissolve in the copolymer, forms minute channels of liquid within the overall solid particle. When the copolymerization is complete and the liquid is removed, the particle has true macroporosity as shown by the measurement of its specific surface.

Compounds which can cause this macroreticular structure in monovinylaromatic-polyvinylaromatic monomer mixtures include alkanols with a carbon content of from 4 to 10, such as n-butanol, t-amyl alcohol and decanol. Higher saturated aliphatic hydrocarbons, such as heptane and isooctane also give the desired effect when used in amounts sufficient to cause phase separation. A typical preparation of a macroreticular-structured resin is described in Preparation I. When the dried product was dropped into a fluid such as hexane, fine bubbles were seen to rise from the immersed particles due to displacement by the organic fluid of air held within the void spaces of the resin.

In the absence of this material which causes phase separation, the so-called conventional copolymers are obtained which do not have the macroreticular structure and which have very low specific surface. Such copolymers, when halomethylated, can be reacted with thiourea or sodium hydrosulfide to form redox polymers.

The copolymers are halomethylated by treatment with halomethyl ether and aluminum chloride, generally in a swelling solvent, such as ethylene dichloride. Whereas bromomethyl ether can be employed as the halomethylating agent, chloromethyl ether is preferred because of availability and economy. The halomethylated copolymer is then reacted with thiourea, preferably in a solvent which will swell the halomethylated beads, ethylene dichloride or dioxane being typical, and in a solvent for the thiourea, ethanol being typical. The mixed solvent may be of any proportion such that the beads will swell and the thiourea will remain in solution. A typical solvent composition is 40% dioxane and 60% ethanol. The isothiouronium salt is then decomposed with an agent such as sodium hydroxide in ethanol.

When the redox polymers of the present invention are to be used in non-aqueous media, it is preferred that substantially all of the halomethyl groups on the polymer chain be reacted with thiourea or sodium hydrosulfide.

When it is desired to use the redox polymers in aqueous or highly polar media, then it is often desirable to introduce some polar groups into the polymer chain in order to increase the hydrophilicity or wetting characteristics of the polymer, and also to make it swellable in water and other polar solvents.

Polar groups can be introduced by reacting only part of the halomethyl groups on the polymer with thiourea or sodium hydrosulfide. The remaining halomethyl groups can then be aminated in the usual fashion with a primary, secondary, or tertiary amine. The resulting polymer not only shows redox properties, but it is also more easily wetted and swollen by water and other polar solvents. In addition, it has anion exchange capacity, and functions as a combination redox-anion exchange resin. From 3% to 50% of the halomethyl groups on the polymer backbone can be aminated, thus giving a variable and controllable ratio between the reduction-oxidation capacity of the resin and the anion exchange capacity.

In a like manner, by leaving some of the halomethyl groups available for further reaction, it is possible to introduce other polar groups into the polymer chain. Thus, the halomethyl groups remaining can be reacted with glycolic acid to form a redox polymer with carboxylic cation exchange activity. The presence of the carboxylic group also increases the wetting and swelling properties of the resin in polar liquids such as water.

In the case of the redox resins which possess anion or carboxylic activity, and depending on the composition of the surrounding medium in which it is being used, it is possible that the pH of the medium will be altered, thus altering the oxidation-reduction potential of the redox group.

While for the purpose of illustration hereinbefore, we have referred to thiourea and sodium hydrosulfide as the reagents adding to the macroreticular chloromethylated backbone polymer, actually there are a large number of sulfur containing compounds which function satisfactorily. Thus, substituted thioureas and metal hydrosulfides function satisfactorily, as do thiol acids and thioketones.

Typical of the thioureas which can be used are the following: N-methyl thiourea, N-ethyl thiourea, N-n-propyl thiourea, N-isopropyl thiourea, N-phenyl thiourea, N-tolyl thioureas, N-chlorophenyl thioureas, N-bromophenyl thioureas, N-chlorotolyl thioureas, N-acetyl thiourea, N-benzoyl thiourea, N-allyl thiourea, N-benzyl thiourea, N,N-dimethyl thiourea, N,N-diethyl thiourea, N,N-n-propyl thiourea, N,N-diphenyl thiourea, N,N-phenyl tolyl thiourea, N,N'-dimethyl thiourea, N,N'-diethyl thiourea, N,N'-methyl phenyl thiourea and mixtures thereof.

Typical of the metal hydrosulfides which can be used are sodium hydrosulfide and potassium hydrosulfide.

The oxidized form of the redox resins of the present invention, i.e. the disulfide form, is easily reduced by treatment with a reducing agent such as 10% aqueous sodium bisulfite. Sodium thiosulfate may also be used. The reduced, or mercaptyl form of these resins, can be readily oxidized to the disulfide form by treatment with the solutions of such oxidizing agents as iodine, ceric chloride or ceric sulfate, ferric sulfate, potassium permanganate, etc.

The interconvertibility of the two forms of redox resins is well-known in the art, and does not constitute the present invention.

The redox capacities given in the following tables are determined by measuring the amount of iodine which is reduced by the mercaptyl form of the resin. The capacities are expressed in milliequivalents of iodine reduced per gram (dry weight) of resin.

The redox polymer in Example I was prepared using a "conventional" backbone copolymer. These copolymers were prepared by suspension copolymerizing a mixture of styrene and divinylbenzene without the use of a liquid which is a solvent for the monomer mixture and which is not imbibed, nor will it swell, the copolymer so produced.

Examples II to VIII were prepared by using a copolymer which had a macroreticular structure, and which was prepared by copolymerizing a mixture of styrene and divinylbenzene in the presence of a liquid which was a solvent for the monomer mixture, and which would not swell or be imbibed by the copolymer. The preparation of typical macroreticular-structured copolymers is set forth in detail hereinbefore. These macroreticular-structured copolymers are characterized by high porosity and high specific surface, and the redox polymers based thereon also exhibit those properties. Because of their high specific surface, they are characterized by rapid reaction rates and high capacities.

The surface area of the macroreticular redox resins described in this invention is from at least 10 to 500 times greater than that of conventional gel-type resins described in the prior art. Since the rates of reaction are diffusion dependent and the rate of diffusion is proportional to the surface area, the rate of reaction of the macroreticular resins are from at least 10 to 500 times greater than those of typical gel-type resins.

A comparison of the characteristics of the macroreticular-structured redox polymers of the present invention with conventional redox polymers of substantially comparable chemical composition is presented in Table I. It is to be noted that the conventional resin was approximately 100 to 200 mesh whereas the macroreticular-structured redox resins were approximately 20 to 50 mesh.

Table II shows very clearly the reactivity of these macroreticular-structured redox resins in terms of rate of reaction as well as ultimate available capacity, particularly when compared with conventional redox polymers of substantially the same composition. The values given for redox activity are in terms of milliequivalents of iodine reduced per gram of resin (dry weight) and it must again be remembered that the conventional or gel type resin was finely ground (approximately 100 to 200 mesh), and this should have increased the rate of reaction markedly when compared with the resins which are in the 20 to 50 mesh range.

It is to be noticed from these values that very little reaction has occurred with the gel type after one hour contact with the iodine solution, whereas all three macroreticular resins have reacted to a high percentage of their total capacity.

TABLE I

CHARACTERISTICS OF SULFHYDRYL ADDUCTS ON VARIOUS POLY(STYRENE-DVB) MATRICES

| Bead Type | Conventional Gel-Type Resins | Macroreticular Resins | | |
|---|---|---|---|---|
| | A [1] | B | C | D |
| Chemical Composition of Matrix Preparation: | | | | |
| (a) Percent Styrene | 97 | 80 | 80 | 97 |
| (b) Percent DVB | 3 | 20 | 20 | 3 |
| (c) TAA [2] | None | 45 | 33 | 46.5 |
| Elemental Analysis: | | | | |
| (a) Percent C | 72.40 | 78.43 | 80.04 | 74.16 |
| (b) Percent H | 6.73 | 7.28 | 7.34 | 7.10 |
| (c) Percent S | 20.51 | 10.97 | 10.41 | 18.17 |
| (d) Percent Cl (residual) | 1.22 | 0.42 | 1.48 | 0.61 |
| (e) Percent Ash | 0.87 | 0.32 | 0.10 | 0.24 |
| Swelling Ratios: | | | | |
| (a) Ethylene dichloride | 1.30 | 1.30 | 1.10 | 1.10 |
| (b) Benzene | 1.00 | 1.20 | 1.05 | 1.20 |
| (c) Methanol | 1.00 | 1.15 | 1.00 | 1.05 |
| (d) Water | 1.00 | 1.00 | 1.00 | 1.00 |
| Percent Moisture | 29.4 | 54.2 | 38.6 | 43.0 |
| Surface Area (m.²/g.) | ([3]) | 59.2 | 67.0 | 19.2 |
| Porosity (percent) | | 11 | 53 | 38 | 36 |
| Redox Capacity (meq./g.) | 2.40 | 5.27 | 4.48 | 4.89 |

[1] Finely divided powder.
[2] TAA is tert-amyl alcohol.
[3] None apparent.

TABLE II

REACTIVITY OF POLY(VINYL BENZYL MERCARTAN) COPOLYMER ON VARIOUS POLY(STYRENE-DVB) MATRICES

| Bead Type | Gel-Type | Macroreticular | | |
|---|---|---|---|---|
| | A | B | C | D |
| Contact Time of Beads with Solution: | | | | |
| 0 minutes | 0.00 | 0.00 | 0.00 | 0.00 |
| 5 minutes | 0.29 | 2.08 | 0.97 | 0.73 |
| 15 minutes | 0.78 | 2.99 | 2.15 | 1.42 |
| 30 minutes | 0.68 | 3.24 | 2.66 | 2.40 |
| 1 hour | 0.80 | 4.63 | 3.58 | 3.16 |
| 2 hours | | 4.97 | 3.76 | 4.38 |
| 4 hours | 0.84 | 5.04 | 3.96 | 4.76 |
| 8 hours | 1.12 | 5.19 | 4.02 | 4.97 |
| 24 hours | 1.72 | 5.18 | 3.97 | 5.00 |
| 48 hours | 2.40 | 5.27 | 4.48 | 4.89 |

The following examples, in which all parts are by weight, serve further to illustrate the process of this invention and the products thereof. These examples should not be construed as restrictions upon the scope of this invention.

*Preparation I*

A mixture of 121.6 grams of styrene, 38.4 grams of divinylbenzene (technical grade containing 50.3% active ingredient); 87.0 grams of tert-amyl alcohol and 1.0 gram of benzoyl peroxide is charged to a solution of 6.5 grams of sodium chloride and 0.5 gram of the ammonium salt of a commercial styrene-maleic anhydride copolymer in 174 grams of water. The mixture is agitated until the organic components are dispersed as fine droplets and then heated to 86° to 88° C. for six hours. The resultant polymer pearls are filtered, washed with water and freed from excess water and amyl alcohol by drying at elevated temperature. The product is obtained in the form of white opaque spherical particles weighing 145 grams. This copolymer is chloromethylated as described in U.S. Patent 2,629,710.

Preparation II

Procedure according to Preparation I with the exception that 182.4 grams of styrene, 27.8 grams of trivinylbenzene (containing 97.3% active ingredient), 130.5 grams of tert-amyl alcohol and 2.0 grams of benzoyl peroxide are charged to a solution of 9.8 grams of sodium chloride and 0.8 gram of the ammonium salt of a commercial styrene-maleic anhydride copolymer in 261 grams of water. Reaction yields 189.2 grams of white opaque spherical particles that are chloromethylated as described in U.S. Patent 2,629,710.

Preparation III

The procedure according to Preparation II with the exception that the reacting monomers are 137.8 grams of vinyl toluene and 88.7 grams of ethylene glycol dimethacrylate.

Preparation IV

The procedure according to Preparation I with the exception that the reacting monomer used is 198.3 grams of vinyl naphthalene and 38.4 grams of divinylbenzene (containing 50.3% active ingredient).

Example I

To a five-liter, three-neck round bottom flask, fitted with a stirrer, reflux condenser and thermometer is added 200 grams of chloromethylated poly(styrene-divinylbenzene) prepared from a styrene-divinylbenzene copolymer containing 3% divinylbenzene by chloromethylation with chloromethyl ether. It contained 22.66% chloride, had no apparent surface area and a porosity of 11%. Swell the beads for fifteen minutes with 560 ml. of dioxane and then add a solution of 334.8 grams of thiourea in 840 ml. of ethanol. The resulting mixture is heated to reflux, with constant stirring, and refluxing is continued for 24 hours. Reflux temperature is approximately 80–85° C. After cooling the reaction mixture, the dioxane-alcohol solution is removed by filtration and a solution of 60.0 grams of sodium hydroxide in 600 ml. of ethanol is added. This mixture is refluxed, with stirring, for eight hours. When the reaction mixture has cooled, the product is washed three times using 350 ml. portions of 10% aqueous hydrochloric acid. Last traces of impurities are removed by treating beads in a Soxhlet Extractor for sixteen hours with hot water. The beads are dried to constant weight at 80° C. Analytical results for this preparation showed the product to have 72.40% carbon, 6.73% hydrogen, 20.51% sulfur, 1.22% residual chloride, 0.87% ash and a redox capacity of 2.40 meq./g.

Example II

To a three-liter, three-neck round bottom flask, fitted with a stirrer, reflux condenser and thermometer is added 200 grams of chloromethylated styrene-divinylbenzene copolymer containing 20% divinylbenzene by chloromethylation with chloromethyl ether. It contained 14.1% chloride, had a surface area of 59.2 m.²/g. and a porosity of 53%. Swell the beads for fifteen minutes with 560 ml. of dioxane and then add a solution of 334.8 grams of thiourea in 840 ml. of ethanol. The resulting mixture is heated to reflux, with constant stirring, and refluxing is continued for 24 hours. Reflux temperature is 81° C. After cooling the reaction mixture, the dioxane-ethanol solution is removed by filtration and a solution of 60.0 grams of sodium hydroxide in 600 ml. of ethanol is added. This mixture is refluxed with stirring for six hours at 80° C. When the reaction mixture has cooled, the product is washed three times using 350 ml. portions of 10% aqueous hydrochloric acid. Last traces of impurities are removed by treating beads in a Soxhlet extractor for sixteen hours with hot water. The beads are dried to constant weight at 80° C. The final product has 78.43% carbon, 7.28% hydrogen, 10.97% sulfur, 0.42% residual chloride, 0.32% ash and a redox capacity of 5.27 meq./g.

Example III

To a five-liter, three-neck round bottom flask, fitted with a stirrer, reflux condenser and thermometer, is added 200 grams of chloromethylated poly(styrene-divinylbenzene) prepared from a styrene-divinylbenzene copolymer containing 20% divinylbenzene by chloromethylation with chloromethyl ether. It contained 13.1% chloride, had a surface area of 67.0 m.²/g. and a porosity of 38%. Swell the beads for fifteen minutes with 560 ml. of dioxane and then add a solution of 335 grams of thiourea in 560 ml. of ethanol. Stir for one-half hour, heat to reflux, then continue stirring and refluxing for 20 hours. Reflux temperature is 84° C. After cooling the reaction mixture, the dioxane-ethanol solution is removed by filtration and a solution of 60.0 grams of sodium hydroxide in 600 ml. of ethanol is added. This mixture is refluxed with stirring for six hours at 83° C. When the reaction mixture has cooled, the beads are filtered and then steam distilled for 10 hours to remove any volatile impurities. Product is washed three times using 350 ml. portions of 10% aqueous hydrochloric acid and then washed with water until the washings are neutral to pH paper. The beads are dried to constant weight at 80° C. The final product has 80.04% carbon, 7.34% hydrogen, 10.41% sulfur, 1.48% residual chloride, and 0.10% ash and a redox capacity of 4.48 meq./g.

Example IV

To a two liter, three-neck round-bottom flask, fitted with stirrer, reflux condenser and thermometer, is added 135 grams of chloromethylated poly(styrene-divinylbenzene) prepared from a styrene-divinylbenzene copolymer containing 3% divinyl-benzene by chloromethylation with chloromethyl ether. It contained 20.4% chloride, had a surface area of 19.2 m.²/g. and a porosity of 36%. Swell the beads for fifteen minutes with 385 ml. of dioxane and then add to solution of 226.1 grams of thiourea in 564 ml. of ethanol. This mixture is heated to reflux, with constant stirring, and refluxing is contained for 24 hours. Reflux temperature is 84° C. After cooling the reaction mixture, the dioxane-ethanol solution is removed by filtration and a solution of 40.5 grams of sodium hydroxide in 405 ml. of ethanol is added. This mixture is refluxed with stirring for eight hours at 84° C. When the reaction mixture has cooled, the product is washed three times using 333 ml. portions of 10% aqueous hydrochloric acid. Last traces of impurities are removed by treating the beads in a Soxhlet extractor for sixteen hours with hot water. The beads are dried to constant weight at 80° C. The final product has 74.16% carbon, 7.10% hydrogen, 18.17% sulfur, 0.61% residual chloride, 0.24% ash and a redox capacity of 4.89 meq./g.

Example V

Procedure according to Example III with the exception that the chloromethylated beads described in Preparation II were used. The final product has 8.31% sulfur and had a redox capacity of 4.09 meq./g.

Example VI

Procedure according to Example II with the exception that the chloromethylated beads described in Preparation III were used. The final product has 7.39% sulfur and a redox capacity of 3.05 meq./g.

Example VII

The procedure of Example II was employed with the exception that an equivalent amount of the chloromethylated beads described in Preparation IV were used. The final product has 6.73% sulfur and a redox capacity of 1.95 meq./g.

Example VIII

To a two liter, three-neck round-bottom flask, fitted with stirrer, reflux condenser and thermometer is added 135 grams of chloromethylated poly(styrene-divinylbenzene) prepared from a styrene-divinylbenzene copolymer containing 3% divinylbenzene by chloromethylation with chloromethyl ether. It contained 20.4% chloride, had a surface area of 19.2 m.²/g. and a porosity of 36%. Swell the beads for fifteen minutes with 385 ml. of dioxane and then add a solution of 210 grams of sodium hydrosulfide in 575 ml. of ethanol. This mixture is heated to reflux, with constant stirring, and refluxing is continued for 24 hours. Reflux temperature is 86° C. when the reaction mixture has cooled, the product is washed three times using 333 ml. portions of 10% aqueous hydrochloric acid. Last traces of impurities are removed by treating the beads in a Soxhlet extractor for sixteen hours with hot water. The final product contained 12.35% sulfur and had a redox capacity of 2.80 meq./g.

*Example IX*

The procedure of Example IV was employed with the exception that an equivalent amount of methylthiourea was used in place of thiourea. The reaction product was similar to the material described in Example IV.

*Example X*

The procedure of Example IV was employed with the exception that an equivalent amount of phenylthiourea was used in place of thiourea. The reaction product was similar to the material described in Example IV.

*Example XI*

The procedure of Example IV was employed with the exception that an equivalent amount of m-tolylthiourea was used in place of thiourea. The reaction product was similar to the material described in Example IV.

*Example XII*

The procedure of Example IV was employed with the exception that an equivalent amount of N-acetylthiourea was used in place of thiourea. The reaction product was similar to the material described in Example IV.

I claim:
1. A redox polymer prepared by reacting
   (A) a macroreticular-structured halomethylated cross-linked copolymer of a monethylenically unsaturated monomer and a cross-linking agent, the said monomer being selected from the group consisting of styrene, vinyl toluene, α-methylstyrene, vinyl naphthalene, and the lower alkyl esters of acrylic and methacrylic acid, and the said cross-linker being selected from the group consisting of divinylbenzene, divinyltoluene, divinylnaphthalene, diallyl phthalate, ethylene glycol diacrylate, ethylene glycol dimethacrylate, divinylxylene, divinylethylbenzene, divinylsulfone, the polyvinyl ethers of glycol, glycerol and pentaerythritol, the polyallyl ethers of glycol, glycerol and pentaerythritol, monothio derivatives of glycols and resorcinol, dithio derivatives of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-bis(α-methylmethylene sulfonamido) ethylene, trivinylbenzene, trivinylnaphthalene and polyvinylanthracene, with
   (B) a compound selected from the group consisting of thiourea, alkyl and aryl substituted thioureas, and an alkali metal hydrosulfide, and
   (C) hydrolyzing to convert the intermediates to the free sulfhydryl group.
2. A redox polymer prepared as in claim 1, the reaction temperature being from 40° to 100° C.

References Cited by the Examiner

UNITED STATES PATENTS

| | | | |
|---|---|---|---|
| 2,629,710 | 2/1953 | McBarney | 260—88.1 |
| 3,037,052 | 5/1962 | Bortnick | 260—2.2 |

FOREIGN PATENTS 849,122  9/1960  Great Britain.

OTHER REFERENCES

Parrish, Chemistry and Industry (London), page 137, Feb. 18, 1956.
Parrish, Chem. and Eng. 18, 137 (1956).
Calmon, Ion Exchange in Organic and Biochemistry, pp. 28–31, Interscience Publishers, New York (1957).
Trostyanskaya, Zhur. Anal. Khim. 15, 402–4 (1960). C.A. 55: 12703a (1961).

SAMUEL H. BLECH, *Primary Examiner.*

WILLIAM H. SHORT, *Examiner.*

W. G. GOODSON, J. C. MARTIN, *Assistant Examiners.*